United States Patent [19]

Chunick

[11] Patent Number: 5,801,622

[45] Date of Patent: Sep. 1, 1998

[54] SIGNAL ALARM

[76] Inventor: Richard A. Chunick, 938 Pacific Drive, Delta, British Columbia, Canada, V4M 2K3

[21] Appl. No.: 828,047

[22] Filed: Mar. 28, 1997

[51] Int. Cl.[6] ............................................ B60Q 1/00
[52] U.S. Cl. .................... 340/457; 340/457; 340/449; 340/475; 340/477
[58] Field of Search .......................... 340/457, 477, 340/475, 474, 539, 384.71, 384.6, 870.08, 870.09, 870.1, 460, 531, 692

[56] References Cited

U.S. PATENT DOCUMENTS

| 4,907,844 | 3/1990 | White | 340/457 |
| 4,933,665 | 6/1990 | Bull et al. | 340/457 |
| 5,218,340 | 6/1993 | Shannon, Jr. et al. | 340/475 |
| 5,264,827 | 11/1993 | Giovanni | 340/477 |
| 5,414,407 | 5/1995 | Gerrans et al. | 340/475 |
| 5,625,337 | 4/1997 | Medawar | 340/449 |

*Primary Examiner*—Jeffery A. Hofsass
*Assistant Examiner*—Toan N. Pham

[57] ABSTRACT

A new Signal Alarm for providing an audible beep when the turn signal is operating to notify the vehicle operator that the turn signal is on. The inventive device includes a control means for activating and deactivating a sound generating device operatively coupled to a vehicle turn signal timer can.

5 Claims, 2 Drawing Sheets

FIG 1
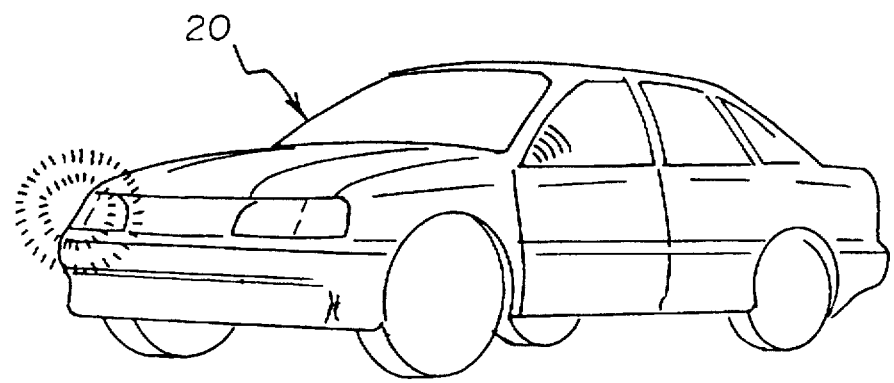
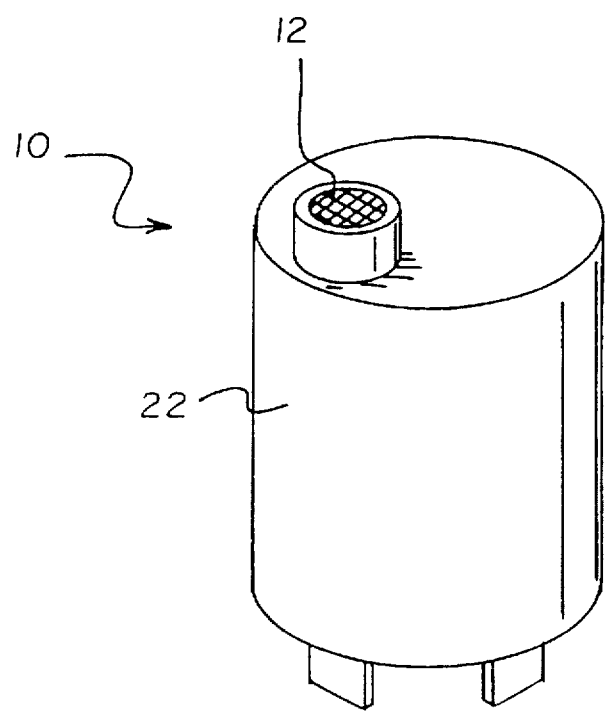
FIG 2

1
SIGNAL ALARM

BACKGROUND OF THE INVENTION

1. Field of the Invention

The present invention relates to turn signal reminder circuits and more particularly pertains to a new Signal Alarm for providing an audible beep when the turn signal is operating to notify the vehicle operator that the turn signal is on.

2. Description of the Prior Art

The use of turn signal reminder circuits is known in the prior art. More specifically, turn signal reminder circuits heretofore devised and utilized are known to consist basically of familiar, expected and obvious structural configurations, notwithstanding the myriad of designs encompassed by the crowded prior art which have been developed for the fulfillment of countless objectives and requirements.

Known prior art turn signal reminder circuits include U.S. Pat No. 4,924,208; U.S. Pat. No. 4,933,665; U.S. Pat. No. 5,414,407; U.S. Pat. No. 5,353,007; and U.S. Pat. No. 5,264,827.

While these devices fulfill their respective, particular objectives and requirements, the aforementioned patents do not disclose a new Signal Alarm. The inventive device includes a control means for activating and deactivating a sound generating device operatively coupled to a vehicle turn signal timer can.

In these respects, the Signal Alarm according to the present invention substantially departs from the conventional concepts and designs of the prior art, and in so doing provides an apparatus primarily developed for the purpose of providing an audible beep when the turn signal is operating to notify the vehicle operator that the turn signal is on.

SUMMARY OF THE INVENTION

In view of the foregoing disadvantages inherent in the known types of turn signal reminder circuits now present in the prior art, the present invention provides a new Signal Alarm construction wherein the same can be utilized for providing an audible beep when the turn signal is operating to notify the vehicle operator that the turn signal is on.

The general purpose of the present invention, which will be described subsequently in greater detail, is to provide a new Signal Alarm apparatus and method which has many of the advantages of the turn signal reminder circuits mentioned heretofore and many novel features that result in a new Signal Alarm which is not anticipated, rendered obvious, suggested, or even implied by any of the prior art turn signal reminder circuits, either alone or in any combination thereof.

To attain this, the present invention generally comprises a control means for activating and deactivating a sound generating device operatively coupled to a vehicle turn signal timer can.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Signal Alarm apparatus and method which has many of the advantages of the turn signal reminder circuits mentioned heretofore and many novel features that result in a new Signal Alarm which is not anticipated, rendered obvious, suggested, or even implied by any of the prior art turn signal reminder circuits, either alone or in any combination thereof.

It is another object of the present invention to provide a new Signal Alarm which may be easily and efficiently manufactured and marketed.

It is a further object of the present invention to provide a new Signal Alarm which is of a durable and reliable construction.

An even further object of the present invention is to provide a new Signal Alarm which is susceptible of a low cost of manufacture with regard to both materials and labor, and which accordingly is then susceptible of low prices of sale to the consuming public, thereby making such Signal Alarm economically available to the buying public.

Still yet another object of the present invention is to provide a new Signal Alarm which provides in the apparatuses and methods of the prior art some of the advantages thereof, while simultaneously overcoming some of the disadvantages normally associated therewith.

Still another object of the present invention is to provide a new Signal Alarm for providing an audible beep when the turn signal is operating to notify the vehicle operator that the turn signal is on.

Yet another object of the present invention is to provide a new Signal Alarm which includes a control means for activating and deactivating a sound generating device operatively coupled to a vehicle turn signal timer can.

Still yet another object of the present invention is to provide a new Signal Alarm that is easy to install.

Even still another object of the present invention is to provide a new Signal Alarm that provides a beep that is louder than the conventional clicking noise.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a right side perspective view of a vehicle.

FIG. 2 is a perspective view of a turn signal timer can showing the present invention mounted thereon.

DESCRIPTION OF THE PREFERRED EMBODIMENT

Figure 3:
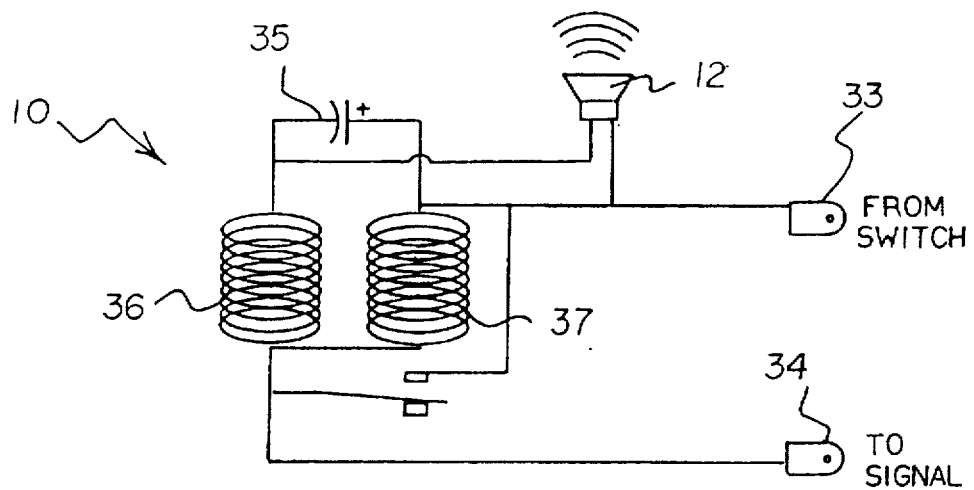
FIG. 3 is schematic view of the present invention.

With reference now to the drawings, and in particular to FIGS. 1 through 4 thereof, a new Signal Alarm embodying the principles and concepts of the present invention and generally designated by the reference numeral 10 will be described.

More specifically, it will be noted that the Signal Alarm 10 comprises a sound generating device 12 mounted on the outside of a vehicle turn signal timer can 22 and control means for activating and deactivating the sound generating device operatively couple to the vehicle turn signal timer can circuit.

As best illustrated in FIGS. 1 through 4, it can be shown that the control means for activating and deactivating the sound generating device includes relay 36 charged by capacitor 35 which upon activation short circuits the sound generating device 12, including a piezo-electric buzzer. When the relay 36 contacts open, current from the timer can contact point 33 flows through the sound generating device 12 and also to a turn signal light through contact point 34.

Figure 4:
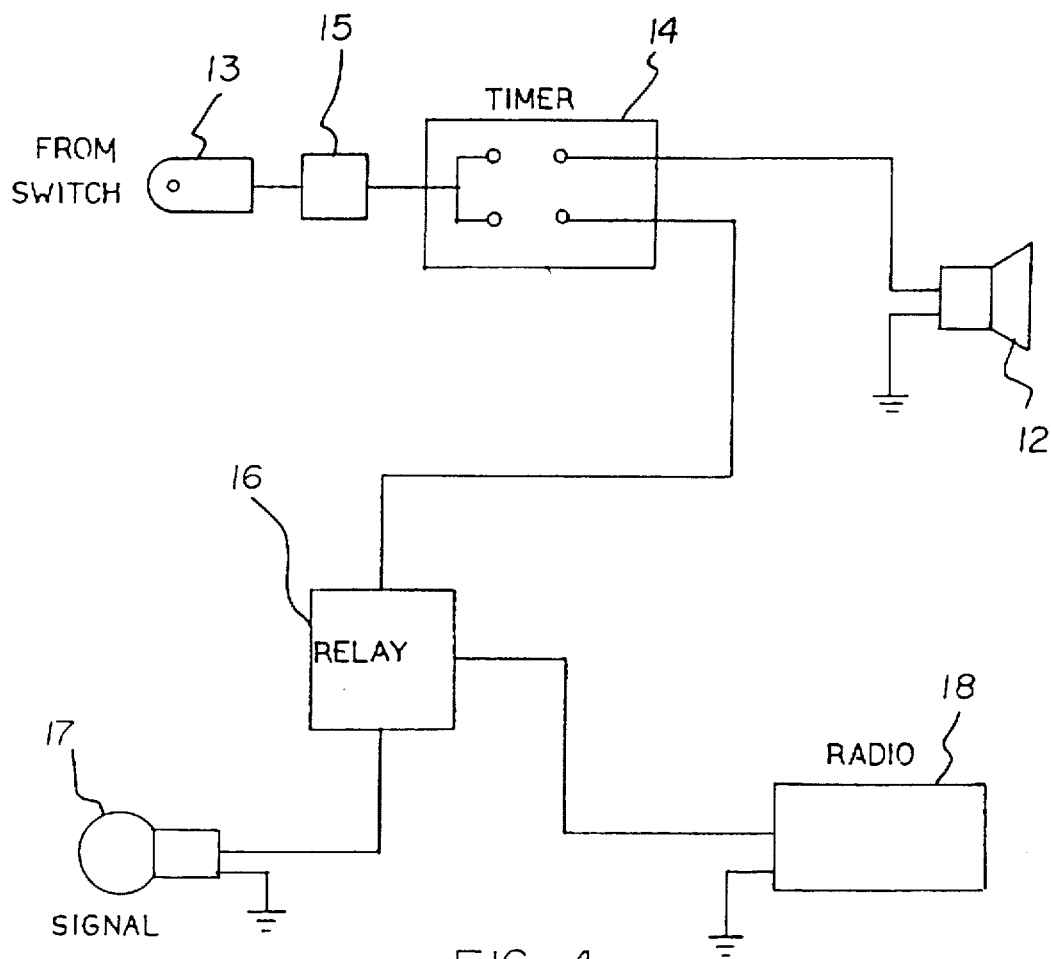
FIG. 4 is a schematic view of an alternative embodiment of the present invention.

With reference to FIG. 4, an alternative embodiment of the present invention is shown. In this embodiment a signal from the turn signal timer can appears at 13 and is inverted by inverter 15. This negative going signal triggers a timer 14, implemented with a conventional and well known 556 IC timer chip and an appropriate RC timing circuit (not shown). One output of the timer 14 activates and deactivates the sound generating device 12. Another output of the timer 14 activates a relay 16 which alternatively activates the turn signal light 17 while cutting off current to a vehicle radio 18.

In use, the Signal Alarm 10 provides an audible beep that is louder than the conventional clicking noise of the turn signal timer can. In the preferred embodiment of the invention, the sound generating device is activated by the LC circuit including relay 36 and capacitor 35. In the alternative embodiment, the sound generating device is activated by timer 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A signal alarm for use with a vehicle turn signal timer can circuit comprising:

a sound generating means for generating sound;

an electronic control means for activating and deactivating the sound generating means, the control means adapted for being operatively coupled to the vehicle turn signal timer can circuit;

wherein the control means for activating and deactivating the sound generating means further includes a contact means, the contact means being adapted for electrical connection of said signal alarm to a signal light; and wherein the contact means includes a radio activation means for alternatively activating and deactivating a vehicle radio, such that the vehicle radio is deactivated when the sound generating means is activated.

2. The signal alarm of claim 1, wherein the control means for activating and deactivating the sound generating means includes a timer, said timer being adapted to delay the activation of said sound generating means for a predetermined time period.

3. The signal alarm of claim 2, wherein the sound generating means further includes a piezo-electric buzzer.

4. The signal alarm of claim 2, wherein the timer further comprises a 556 integrated circuit timer chip.

5. A signal alarm for use with a vehicle turn signal timer can circuit comprising:

a sound generating means for generating sound;

an electronic control means for activating and deactivating the sound generating means, the control means adapted for being operatively coupled to the vehicle turn signal timer can circuit;

wherein said control means includes a relay charged by a capacitor, the capacitor being electrically connected to the sound generating means such that upon activation of said capacitor said sound generating means is deactivated;

wherein the control means for activating and deactivating the sound generating means further includes a contact means;

wherein the contact means includes a radio activation means for alternatively activating and deactivating a vehicle radio;

wherein the control means for activating and deactivating the sound generating means includes a timer;

wherein the sound generating means further includes a piezo-electric buzzer; and wherein the timer further comprises a 556 integrated circuit timer chip.

* * * * *